United States Patent
Kang (10) Patent No.: US 11,529,904 B2
(45) Date of Patent: Dec. 20, 2022

(54) REAR CROSS COLLISION DETECTION SYSTEM AND METHOD

(71) Applicant: HYUNDAI MOBIS CO., LTD., Seoul (KR)

(72) Inventor: Eun Seok Kang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 145 days.

(21) Appl. No.: 17/096,445

(22) Filed: Nov. 12, 2020

(65) Prior Publication Data
US 2021/0146833 A1 May 20, 2021

(30) Foreign Application Priority Data
Nov. 18, 2019 (KR) .......... 10-2019-0148059

(51) Int. Cl.
*B60Q 1/00* (2006.01)
*B60Q 9/00* (2006.01)
(Continued)

(52) U.S. Cl.
CPC .......... *B60Q 9/008* (2013.01); *B60W 30/0956* (2013.01); *B60W 50/14* (2013.01); *G08G 1/166* (2013.01); *B60W 2420/52* (2013.01); *B60W 2554/4041* (2020.02); *B60W 2554/4042* (2020.02); *B60W 2554/4044* (2020.02)

(58) Field of Classification Search
CPC ... B60Q 9/008; B60W 30/0956; B60W 50/14; B60W 2554/4041; B60W 2554/4042; B60W 2554/4044; B60W 2420/52; G08G 1/166
See application file for complete search history.

(56) References Cited

U.S. PATENT DOCUMENTS

| 11,043,118 B1* | 6/2021 | Critchley | G08G 1/052 |
| 2006/0115122 A1* | 6/2006 | Nagaoka | G06T 7/215 |
| | | | 382/104 |

(Continued)

FOREIGN PATENT DOCUMENTS

KR 10-1843251 B1 3/2018

OTHER PUBLICATIONS

Shin et al., Effects of Vehicular Communication on Risk Assessment in Automated Driving Vehicles (Year: 2018).*

(Continued)

*Primary Examiner* — Quang Pham
(74) *Attorney, Agent, or Firm* — Morgan, Lewis & Bockius LLP (57) ABSTRACT

The present disclosure provides a rear cross collision detection system and method. The rear cross collision detection system includes an obstacle detection unit configured to receive an electromagnetic wave reflected from a reflection point of an obstacle in order to detect the position of the obstacle, an identity determination unit configured to, when a plurality of obstacles is detected by the obstacle detection unit, determine whether the plurality of obstacles is the same object based on the positions or speeds of the detected obstacles, and a collision determination unit configured to determine the possibility of a collision with the plurality of obstacles detected by the obstacle detection unit based on the result of the determination by the identity determination unit.

14 Claims, 8 Drawing Sheets

(51) Int. Cl.
*G08G 1/16* (2006.01)
*B60W 30/095* (2012.01)
*B60W 50/14* (2020.01)

(56) References Cited

U.S. PATENT DOCUMENTS

| | | | | |
|---|---|---|---|---|
| 2006/0239508 | A1* | 10/2006 | Maki | G06V 20/588 |
| | | | | 382/104 |
| 2006/0241844 | A1* | 10/2006 | Mori | B60W 40/105 |
| | | | | 701/93 |
| 2015/0032289 | A1* | 1/2015 | Lotz | H04L 67/12 |
| | | | | 701/1 |
| 2015/0073620 | A1* | 3/2015 | Matsumura | B60W 30/00 |
| | | | | 701/1 |
| 2016/0078759 | A1* | 3/2016 | Nerayoff | G06V 20/593 |
| | | | | 701/3 |
| 2016/0101779 | A1* | 4/2016 | Katoh | G06V 20/56 |
| | | | | 340/435 |
| 2016/0121887 | A1* | 5/2016 | Jeon | B60W 30/0956 |
| | | | | 701/301 |
| 2017/0015315 | A1* | 1/2017 | Hattori | B60R 21/0132 |
| 2017/0282915 | A1* | 10/2017 | Kim | B60W 30/09 |
| 2018/0118099 | A1* | 5/2018 | Kunii | B60Q 1/38 |
| 2018/0208208 | A1* | 7/2018 | Chen | B60R 16/037 |
| 2019/0001978 | A1* | 1/2019 | Takaki | B60W 40/076 |
| 2019/0283739 | A1* | 9/2019 | Kim | B60W 30/0953 |
| 2019/0299986 | A1* | 10/2019 | Saito | B60K 28/10 |
| 2019/0329744 | A1* | 10/2019 | Kim | B60T 13/662 |
| 2019/0329794 | A1* | 10/2019 | Kim | B60W 30/0953 |
| 2019/0355132 | A1* | 11/2019 | Kushleyev | G06V 20/56 |
| 2019/0359204 | A1* | 11/2019 | Saito | B60W 30/08 |
| 2019/0366963 | A1* | 12/2019 | Kumashiro | H05K 9/002 |
| 2020/0055494 | A1* | 2/2020 | Baba | B60T 7/22 |
| 2020/0062277 | A1* | 2/2020 | Kim | G01S 13/931 |
| 2020/0108805 | A1* | 4/2020 | Woo | G01S 13/867 |
| 2020/0122773 | A1* | 4/2020 | Deshpande | B60T 7/12 |
| 2020/0202709 | A1* | 6/2020 | Georgis | G06V 20/584 |
| 2020/0329215 | A1* | 10/2020 | Tsunashima | H04N 5/247 |
| 2020/0361490 | A1* | 11/2020 | Ribero | B60W 30/17 |
| 2021/0323446 | A1* | 10/2021 | Christensen | B60N 2/0276 |

OTHER PUBLICATIONS

Yeong et al., Sensor and Sensor Fusion Technology in Autonomous Vehicles A Review (Year: 2021).*

* cited by examiner

REAR CROSS COLLISION DETECTION SYSTEM AND METHOD

CROSS-REFERENCE TO THE RELATED APPLICATION

This application claims priority from Korean Patent Application No. 10-2019-0148059, filed on Nov. 18, 2019, in the Korean Intellectual Property Office, the disclosure of which is incorporated herein by reference in its entirety.

BACKGROUND OF THE INVENTION

1. Field of the Invention

The present invention relates to a rear cross collision detection system and method for detecting an obstacle moving in a direction crossing the travel direction of a vehicle when the vehicle travels backwards or is stopped and warning a driver of the possibility of a collision with the obstacle.

2. Description of the Related Art

With the development of advanced technologies related to autonomous driving of vehicles, various vehicle safety technologies have been developed to increase convenience and safety for drivers, and have been applied to production vehicles.

Specifically, there have been developed technologies for detecting the possibility of a collision between a host vehicle and another vehicle or an obstacle, warning a driver of the possibility of the collision, and controlling the vehicle to avoid the collision. As an example of such technologies, there is a rear cross collision warning (RCCW) technology, which detects an obstacle approaching in a lateral direction when a vehicle is stopped or travels backwards, and warns a driver of the approach of the obstacle.

However, the rear cross collision warning technology uses radar to detect an obstacle approaching a host vehicle, which causes a problem in that a single obstacle may be recognized as multiple obstacles.

In the case of a relatively long obstacle, the conventional art has a problem in that some reflection points of the obstacle are newly recognized in a range close to the host vehicle, and thus a single obstacle is recognized as multiple obstacles. Accordingly, the reliability of determination of the possibility of a collision with the newly recognized obstacle is low, thus causing a problem in that the driver is incorrectly warned, or is not warned of the possibility of a collision.

The information disclosed in this Background of the Invention section is only for enhancement of understanding of the general background of the invention, and should not be taken as an acknowledgement or any form of suggestion that this information forms the related art already known to a person skilled in the art.

SUMMARY OF THE INVENTION

Therefore, the present invention has been made in view of the above problems, and it is an object of the present invention to provide a rear cross collision detection system and method for improving the reliability of determination of the possibility of a collision with a newly recognized obstacle when a single obstacle is recognized as multiple obstacles.

In accordance with an aspect of the present invention, the above and other objects can be accomplished by the provision of a rear cross collision detection system including an obstacle detection unit configured to receive an electromagnetic wave reflected from a reflection point of an obstacle in order to detect the position of the obstacle, an identity determination unit configured to, when a plurality of obstacles is detected by the obstacle detection unit, determine whether the plurality of obstacles is the same object based on the positions or speeds of the detected obstacles, and a collision determination unit configured to determine the possibility of a collision with the plurality of obstacles detected by the obstacle detection unit based on the result of the determination by the identity determination unit.

The obstacle detection unit may be connected to radar sensors, respectively located at rear-end portions of both lateral sides of a vehicle, in order to detect the position of the obstacle located behind or beside the vehicle.

The identity determination unit may calculate the difference in the longitudinal-directional position or the difference in the transverse-directional position between the plurality of obstacles based on the detected positions of the plurality of obstacles, and may determine that the plurality of obstacles is the same object when the calculated difference in the longitudinal-directional position or the calculated difference in the transverse-directional position is equal to or less than a predetermined position difference.

The identity determination unit may calculate the difference in the longitudinal-directional speed or the difference in the transverse-directional speed between the plurality of obstacles based on the detected positions of the plurality of obstacles, and may determine that the plurality of obstacles is the same object when the calculated difference in the longitudinal-directional speed or the calculated difference in the transverse-directional speed is equal to or less than a predetermined speed difference.

The rear cross collision detection system may further include a direction estimation unit configured to estimate the moving direction of the obstacle based on the position of the obstacle, detected by the obstacle detection unit. The collision determination unit may determine the possibility of a collision with the obstacle based on the moving direction of the obstacle, estimated by the direction estimation unit.

The direction estimation unit may calculate the ratio of a change in the longitudinal-directional position of the obstacle to a change in the transverse-directional position of the obstacle using the positions of the plurality of obstacles, detected by the obstacle detection unit, in order to estimate the moving direction of the obstacle.

When the approach angle between the moving direction of the obstacle, estimated by the direction estimation unit, and the transverse axis of the vehicle is equal to or greater than a predetermined first angle, the identity determination unit may calculate the difference in the longitudinal-directional position between the plurality of obstacles based on the detected positions of the plurality of obstacles, and may determine that the plurality of obstacles is the same object when the calculated difference in the longitudinal-directional position is equal to or less than a predetermined position difference.

When the approach angle between the moving direction of the obstacle, estimated by the direction estimation unit, and the transverse axis of the vehicle is less than a predetermined second angle, the identity determination unit may calculate the difference in the transverse-directional position between the plurality of obstacles based on the detected positions of the plurality of obstacles, and may determine that the plurality of obstacles is the same object when the calculated difference in the transverse-directional position is equal to or less than a predetermined position difference.

Upon determining that the plurality of obstacles is the same object, the identity determination unit may determine the obstacle detected first by the obstacle detection unit to be a first obstacle, and may determine the obstacle subsequently detected by the obstacle detection unit to be a second obstacle. The collision determination unit may determine the possibility of a collision with the second obstacle on the assumption that the moving direction of the second obstacle is the same as the moving direction of the first obstacle.

The rear cross collision detection system may further include a reliability determination unit configured to collect a plurality of moving directions of the obstacle, estimated by the direction estimation unit, and to determine the reliability of estimation of the moving direction of the obstacle using the number of collected moving directions and the variance or standard deviation between the collected moving directions. When the estimation reliability determined by the reliability determination unit is equal to or greater than a predetermined level, the collision determination unit may determine the possibility of a collision with the obstacle based on the moving direction of the obstacle.

The obstacle detection unit may calculate the transverse-directional distance from the vehicle to the obstacle and the transverse-directional speed of the obstacle using the detected position of the obstacle. The collision determination unit may calculate an estimated time to collision based on the calculated transverse-directional distance and transverse-directional speed, and may determine that there is the possibility of a collision with the obstacle when the obstacle is located within a predetermined region and the estimated time to collision is equal to or less than a predetermined time.

The collision determination unit may set the transverse-directional speed of the obstacle using the previously detected transverse-directional speed of the obstacle and the currently detected transverse-directional speed of the obstacle based on the moving direction of the obstacle.

The collision determination unit may modify the predetermined region such that a portion of the region close to the vehicle is excluded from the predetermined region based on the moving direction of the obstacle.

The rear cross collision detection system may further include a notification unit configured to notify the driver of the possibility of a collision with the obstacle when the collision determination unit determines that there is the possibility of a collision with the obstacle.

In accordance with another aspect of the present invention, there is provided a rear cross collision detection method including receiving an electromagnetic wave reflected from a reflection point of an obstacle to detect the position of the obstacle, when a plurality of obstacles is detected, determining whether the plurality of obstacles is the same object based on the positions or speeds of the detected obstacles, and determining the possibility of a collision with the plurality of obstacles detected by an obstacle detection unit based on the result of the determining whether the plurality of obstacles is the same object.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Various exemplary embodiments will now be described more fully with reference to the accompanying drawings, in which only some exemplary embodiments are shown. Specific structural and functional details disclosed herein are merely representative for the purpose of describing exemplary embodiments. The present invention, however, may be embodied in many alternative forms, and should not be construed as being limited only to the exemplary embodiments set forth herein.

Accordingly, while exemplary embodiments of the invention are capable of being variously modified and taking alternative forms, embodiments thereof are shown by way of example in the drawings and will herein be described in detail. It should be understood, however, that there is no intent to limit the present invention to the particular exemplary embodiments disclosed. On the contrary, exemplary embodiments are to cover all modifications, equivalents, and alternatives falling within the scope of the invention.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present invention.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g. "between" versus "directly between", "adjacent" versus "directly adjacent", etc.).

The terminology used herein is for the purpose of describing particular embodiments only and is not intended to be limiting of exemplary embodiments of the invention. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Hereinafter, exemplary embodiments of the present invention will be described with reference to the accompanying drawings. In the drawings, the same reference numerals refer to the same components.

Figure 1:
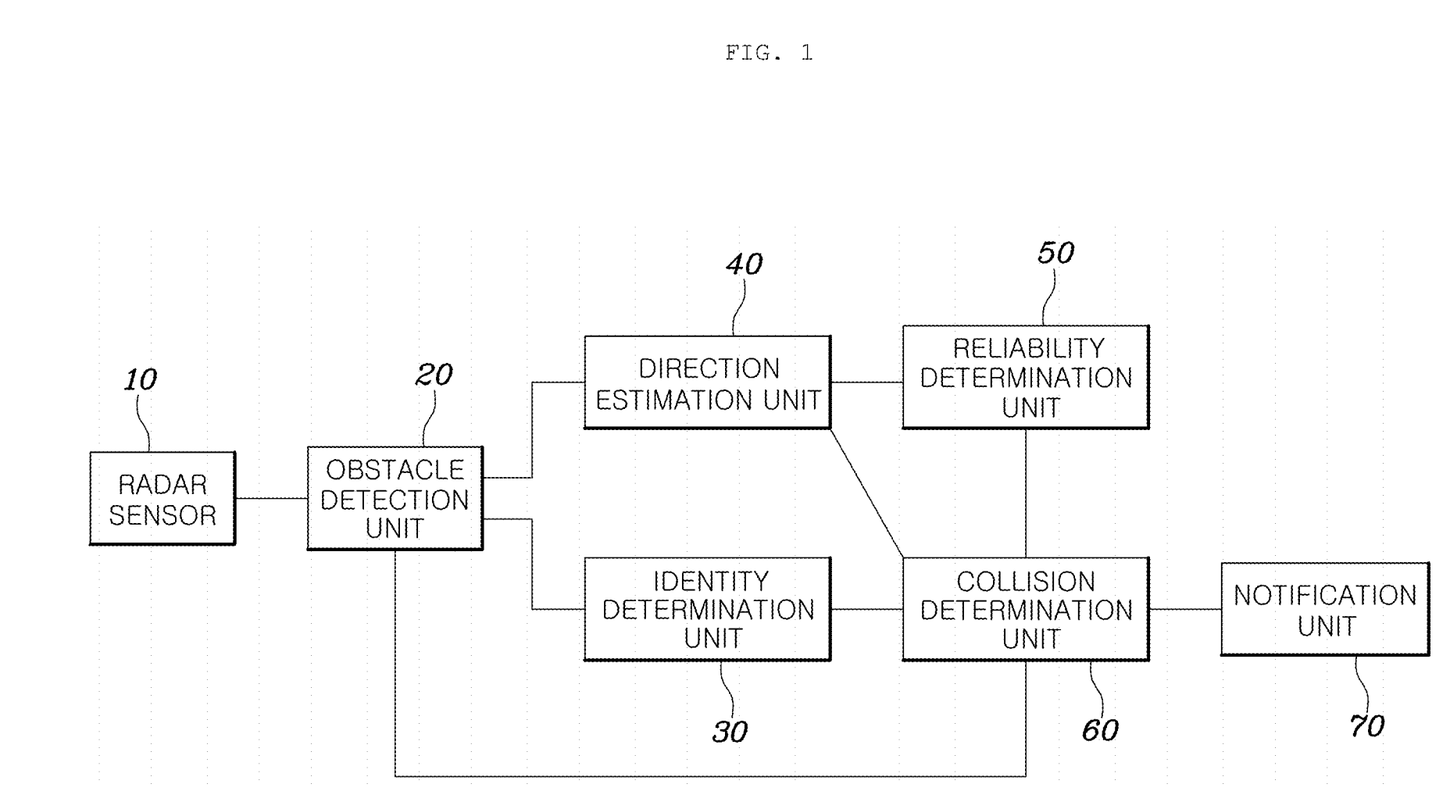
FIG. 1 is a block diagram of a rear cross collision detection system according to an embodiment of the present invention.
Figure 2:
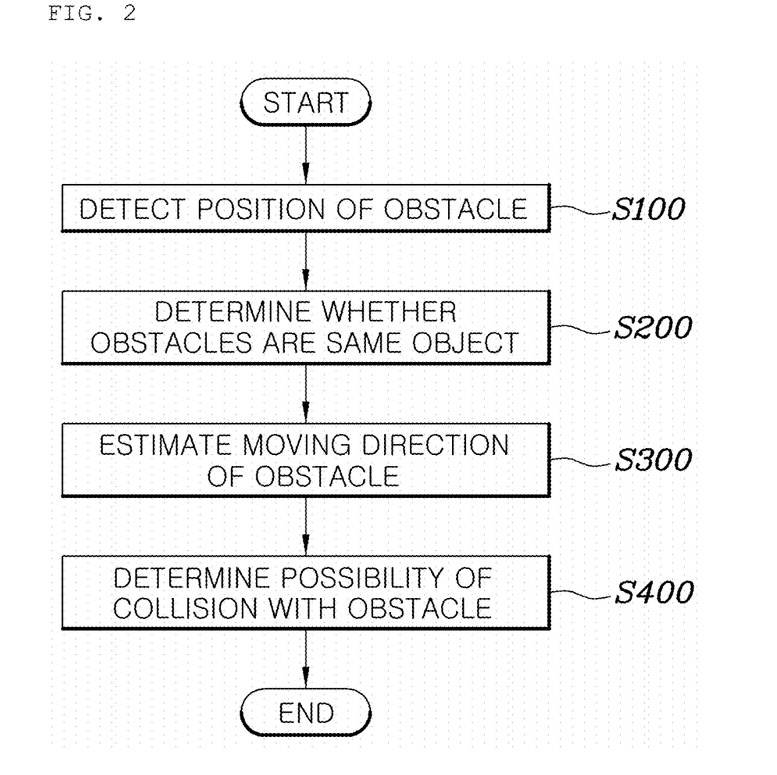
FIG. 2 is a flowchart of a rear cross collision detection method according to an embodiment of the present invention.

FIG. 1 is a block diagram of a rear cross collision detection system according to an embodiment of the present invention, and FIG. 2 is a flowchart of a rear cross collision detection method according to an embodiment of the present invention.

Referring to FIGS. 1 and 2, a rear cross collision detection system according to an embodiment of the present invention includes an obstacle detection unit 20, which receives an electromagnetic wave reflected from a reflection point of an obstacle B and detects the position of the obstacle B, an identity determination unit 30, which, when a plurality of obstacles B is detected by the obstacle detection unit 20, determines whether the plurality of obstacles B is the same object based on the positions or speeds of the detected obstacles B, and a collision determination unit 60, which determines the possibility of a collision with the plurality of obstacles B detected by the obstacle detection unit 20 based on the result of the determination by the identity determination unit 30.

The identity determination unit 30, a direction estimation unit 40, a reliability determination unit 50, the collision determination unit 60, and a notification unit 70 according to an exemplary embodiment of the present invention may be implemented through a processor (not shown) configured to execute the operations to be described below using a non-volatile memory (not shown), which is configured to store an algorithm for controlling the operation of various components of a vehicle or data related to a software command for executing the algorithm, and using data stored in the corresponding memory. Here, the memory and the processor may be implemented as respective chips. Alternatively, the memory and the processor may be implemented as a single integrated chip. The processor may alternatively take the form of one or more processors.

A rear cross collision detection method according to an embodiment of the present invention includes a step of receiving an electromagnetic wave reflected from a reflection point of an obstacle B to detect the position of the obstacle B (S100), a step of, when a plurality of obstacles B is detected, determining whether the plurality of obstacles B is the same object based on the positions or speeds of the detected obstacles B (S200), and a step of determining the possibility of a collision with the plurality of obstacles B detected by the obstacle detection unit 20 based on the result of the determination on whether the plurality of obstacles B is the same object (S400).

The rear cross collision detection method according to an embodiment of the present invention may further include a step of estimating the moving direction of the obstacle B (S300) before the step of determining the possibility of a collision with the obstacle B (S400). In the step of estimating the moving direction of the obstacle B (S300), depending on the result of the determination on whether the plurality of obstacles B is the same object, it may be assumed that the moving direction of the following obstacle B is the same as the moving direction of the preceding obstacle B, or the moving direction of the following obstacle B may be estimated based on the moving direction of the preceding obstacle B.

The obstacle detection unit 20 may be configured to detect the position of the obstacle B using various sensors such as, for example, a radar sensor, an ultrasonic sensor, and a lidar sensor. The obstacle detection unit 20 may detect the position of the obstacle B relative to the vehicle A, and may calculate the distance from the vehicle A to the obstacle B.

The obstacle detection unit 20 may transmit an electromagnetic wave, and may receive the electromagnetic wave reflected from a reflection point of the obstacle B to detect the position of the obstacle B. A sensor for transmitting or receiving an electromagnetic wave may be located at the rear-end portion of the vehicle A.

Specifically, the obstacle detection unit 20 may be connected to radar sensors 10, which are respectively located at the rear-end portions of both lateral sides of the vehicle A, in order to detect the position of the obstacle B located behind or beside the vehicle A.

Each of the radar sensors 10 may emit an electromagnetic wave having a microwave frequency toward the obstacle B, and may receive the electromagnetic wave reflected from the obstacle B to detect the distance to the obstacle B, the moving direction of the obstacle B, and the altitude of the obstacle B. The radar sensors 10 may be provided at respective lateral sides of the vehicle A, specifically at respective side/rear-end portions of the vehicle A. The detection area of the radar sensors 10 may have an angular range extending from the area behind the vehicle A in both lateral directions.

In addition, the obstacle detection unit 20 may detect changes in the position of the obstacle B, and may calculate the speed of the obstacle B using the detected changes in the position of the obstacle B. In particular, the obstacle detection unit 20 may divide each of the distance between the vehicle A and the obstacle B and the speed of the obstacle B into a longitudinal-directional component and a transverse-directional component.

When a plurality of obstacles B is detected by the obstacle detection unit 20, the identity determination unit 30 may determine whether the plurality of obstacles B is the same object based on the positions or speeds of the detected obstacles B. As will be described later, the identity determination unit 30 may determine whether a first obstacle and a second obstacle are the same object.

Here, the same object may refer to a single integral object, or may refer to an object composed of separate parts that are interlocked with each other such that the positions, speeds, or moving directions thereof are restricted by each other.

The collision determination unit 60 may determine the possibility of a collision with the first obstacle or the second obstacle based on a determination on whether the first obstacle and the second obstacle are the same object.

Specifically, the collision determination unit 60 may determine the possibility of a collision with the first obstacle, which is detected first. Then, the collision determination unit

60 may determine the possibility of a collision with the second obstacle, which is detected later than the first obstacle, using the factors used to determine the possibility of a collision with the first obstacle, such as the position, speed, or moving direction of the first obstacle.

However, because the second obstacle is detected in a range relatively close to the vehicle A, the amount of data on the position, speed, or moving direction of the second obstacle, which is obtained by the obstacle detection unit 20, is relatively small, and thus the reliability of the data on the second obstacle is low.

Therefore, the collision determination unit 60 may estimate the position, speed, or moving direction of the second obstacle, which is detected in a range close to the vehicle A, based on that of the first obstacle, thereby more accurately determining the possibility of a collision with the second obstacle.

Figure 3:
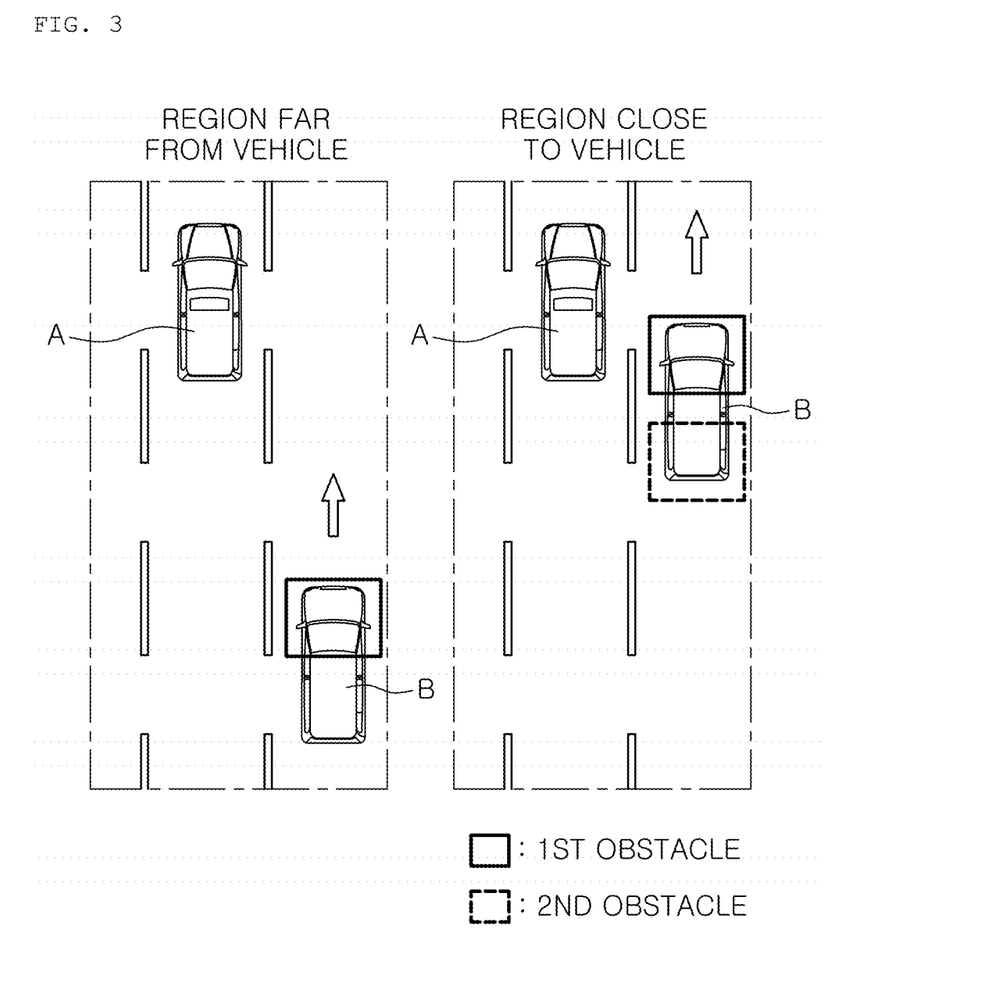
FIG. 3 is a diagram showing a reflection point and a main reflection point of an obstacle when the obstacle moves parallel to a vehicle and is located in each of a region far from and a region close to the vehicle.

FIG. 3 is a diagram showing a reflection point and a main reflection point of the obstacle B when the obstacle B moves parallel to the vehicle A and is located in each of a region far from and a region close to the vehicle A.

Referring to FIG. 3, in the embodiment of the present invention, in which the radar sensor 10 located at the rear-end portion of the vehicle A detects the position of the obstacle B located behind or beside the vehicle A, when the obstacle B is located in a region far from the vehicle A, a reflection point may be formed on the front-surface portion of the obstacle B, and when the obstacle B is located in a region close to the vehicle A, a reflection point may be formed on the side-surface portion of the obstacle B.

In particular, as shown in the drawing, when the obstacle B moves beside the vehicle A in the longitudinal direction of the vehicle A, if the obstacle B is long in the longitudinal direction, a plurality of main reflection points may be formed on the obstacle B, which may cause a problem in which the single obstacle B is recognized as multiple obstacles.

Here, the longitudinal direction of the vehicle A is the overall length direction of the vehicle A, and the transverse direction of the vehicle A is the overall width direction of the vehicle A. The main reflection point is the one among the reflection points of the obstacle B that is detected as being closest to the vehicle A, or is the one among the reflection points of the obstacle B from which the magnitude of the reflected electromagnetic wave is the largest.

The identity determination unit 30 may calculate the difference in the longitudinal-directional position and the difference in the transverse-directional position between the plurality of obstacles B based on the detected positions of the plurality of obstacles B, and may determine that the plurality of obstacles B is the same object when the calculated difference in the longitudinal-directional position and the calculated difference in the transverse-directional position are equal to or less than respective predetermined position differences.

The identity determination unit 30 may calculate the difference in the longitudinal-directional speed and the difference in the transverse-directional speed between the plurality of obstacles B based on the detected positions of the plurality of obstacles B, and may determine that the plurality of obstacles B is the same object when the calculated difference in the longitudinal-directional speed and the calculated difference in the transverse-directional speed are equal to or less than respective predetermined speed differences.

In addition, the identity determination unit 30 may determine whether the time periods during which the detection of the plurality of obstacles B has been maintained from the starting time of detection are different from each other. In particular, the identity determination unit 30 may determine the preceding obstacle B to be a first obstacle, may determine the following obstacle B to be a second obstacle, and may determine whether the first obstacle and the second obstacle are the same object.

Specifically, the identity determination unit 30 may check the following conditions in order to determine whether the plurality of obstacles B is the same object.

TABLE 1

| Condition 1 | Difference in longitudinal-directional position between $1^{st}$ obstacle and $2^{nd}$ obstacle ≤ $1^{st}$ distance |
| Condition 2 | Difference in transverse-directional position between $1^{st}$ obstacle and $2^{nd}$ obstacle ≤ $2^{nd}$ distance |
| Condition 3 | Difference in longitudinal-directional speed between $1^{st}$ obstacle and $2^{nd}$ obstacle ≤ $1^{st}$ speed |
| Condition 4 | Difference in transverse-directional speed between $1^{st}$ obstacle and $2^{nd}$ obstacle ≤ $2^{nd}$ speed |
| Condition 5 | Duration of detection of $1^{st}$ obstacle ≥ Duration of detection of $2^{nd}$ obstacle |

The identity determination unit 30 may determine whether the difference in the longitudinal-directional position, the difference in the transverse-directional position, the difference in the longitudinal-directional speed, and the difference in the transverse-directional speed between the plurality of obstacles B are equal to or less than predetermined position or speed differences. The identity determination unit 30 may selectively determine some of the given conditions, or may determine all of the given conditions.

The rear cross collision detection system according to the embodiment of the present invention may further include a direction estimation unit 40, which estimates the moving direction of the obstacle B based on the position of the obstacle B detected by the obstacle detection unit 20. The collision determination unit 60 may determine the possibility of a collision with the obstacle B based on the moving direction of the obstacle B estimated by the direction estimation unit 40.

The obstacle detection unit 20 may calculate the transverse-directional distance from the vehicle A to the obstacle B and the transverse-directional speed of the obstacle B using the detected position of the obstacle B. The collision determination unit 60 may calculate an estimated time to collision based on the calculated transverse-directional distance and transverse-directional speed, and may determine that there is the possibility of a collision with the obstacle B when the obstacle B is located within a predetermined region and the estimated time to collision is equal to or less than a predetermined time.

Specifically, the obstacle detection unit 20 may calculate the distance from the vehicle A to the obstacle B and the speed of the obstacle B based on the position of the obstacle B. In particular, the obstacle detection unit 20 may divide each of the distance between the vehicle A and the obstacle B and the speed of the obstacle B into a longitudinal-directional component and a transverse-directional component using the distance to the detected position of the obstacle B and the moving direction of the obstacle B.

The collision determination unit 60 may calculate an estimated time to collision based on the calculated transverse-directional distance and transverse-directional speed, and may determine that there is the possibility of a collision with the obstacle B when the obstacle B is located within a predetermined region and the estimated time to collision is equal to or less than a predetermined time.

However, according to the conventional art, in the case in which the obstacle B is spaced apart from the vehicle A in the transverse direction and moves parallel to the vehicle A in the longitudinal direction, there is a problem in that, although there is no possibility of a collision between the obstacle B and the vehicle A, the main reflection point of the vehicle A moves in the transverse direction, and thus the obstacle B is erroneously determined to move in the transverse direction.

Therefore, in order to solve this problem, according to an embodiment of the present invention, the collision determination unit 60 may determine the possibility of a collision with the obstacle B based on the moving direction of the obstacle B, estimated by the direction estimation unit 40. Specifically, even if it is determined that there is the possibility of a collision with the obstacle B based on the position of the obstacle B, detected by the obstacle detection unit 20, and on the distance between the vehicle A and the obstacle B and the speed of the obstacle B, calculated based on the position of the obstacle B, the collision determination unit 60 may determine that there is no possibility of a collision between the vehicle A and the obstacle B based on the moving direction of the obstacle B, estimated by the direction estimation unit 40.

The obstacle detection unit 20 may calculate the transverse-directional distance from the vehicle A to the obstacle B and the transverse-directional speed of the obstacle B using the detected position of the obstacle B. The collision determination unit 60 may calculate an estimated time to collision based on the calculated transverse-directional distance and transverse-directional speed, and may determine that there is the possibility of a collision with the obstacle B when the obstacle B is located within a predetermined region and the estimated time to collision is equal to or less than a predetermined time.

Specifically, the obstacle detection unit 20 may calculate the distance from the vehicle A to the obstacle B and the speed of the obstacle B based on the position of the obstacle B. In particular, the obstacle detection unit 20 may divide each of the distance between the vehicle A and the obstacle B and the speed of the obstacle B into a longitudinal-directional component and a transverse-directional component using the distance to the detected position of the obstacle B and the moving direction of the obstacle B.

The collision determination unit 60 may calculate an estimated time to collision based on the calculated transverse-directional distance and transverse-directional speed, and may determine that there is the possibility of a collision with the obstacle B when the obstacle B is located within a predetermined region and the estimated time to collision is equal to or less than a predetermined time.

Figure 4:
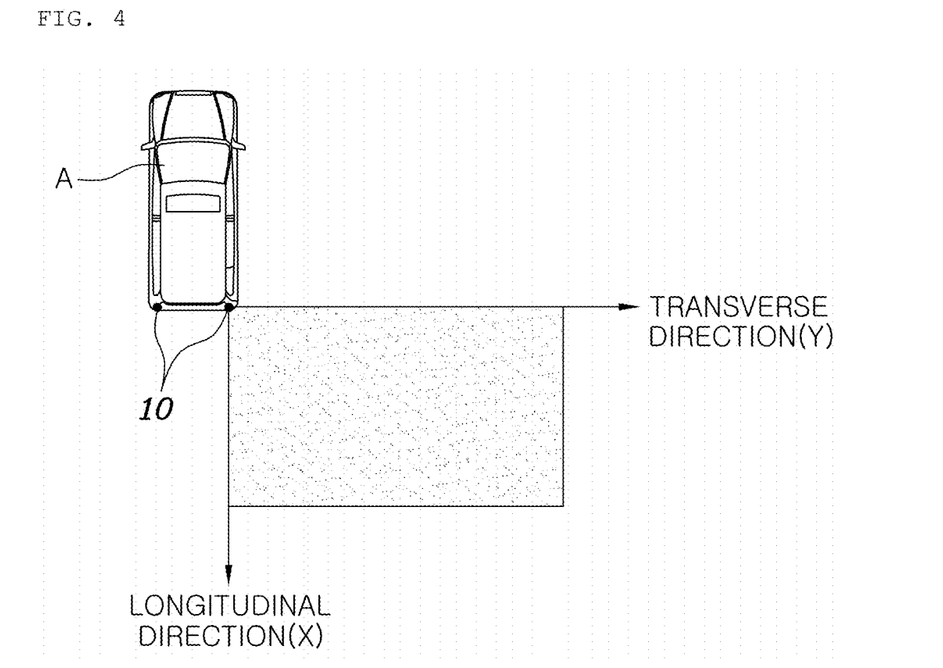
FIG. 4 is a diagram showing a predetermined region according to an embodiment of the present invention.

FIG. 4 is a diagram showing a predetermined region according to an embodiment of the present invention.

Specifically, FIG. 4 shows a predetermined region that the radar sensor 10, which is located at the right rear-end portion of the vehicle A, scans in order to detect the obstacle B. The region that the radar sensor 10, which is located at the left rear-end portion of the vehicle A, scans in order to detect the obstacle B may be set in advance so as to be symmetrical to the region that is scanned by the radar sensor 10 located at the right rear-end portion of the vehicle A.

In addition, the collision determination unit 60 may calculate an estimated time to collision (TTC), and may determine that there is the possibility of a collision with the obstacle B when the calculated estimated time to collision is equal to or less than a predetermined time. In one embodiment, the estimated time to collision may be calculated using the equation below.

$$TTC_k = -(Y\text{-axis position}/Y\text{-axis speed}) = -(Y_k/Yvel_k)$$

Here, k represents a $k^{th}$ radar frame, and TTC represents an estimated time to collision.

In particular, the collision determination unit 60 may determine that there is the possibility of a collision with the obstacle B when the obstacle B is located within a predetermined region and the estimated time to collision is equal to or less than a predetermined time.

Figure 5:
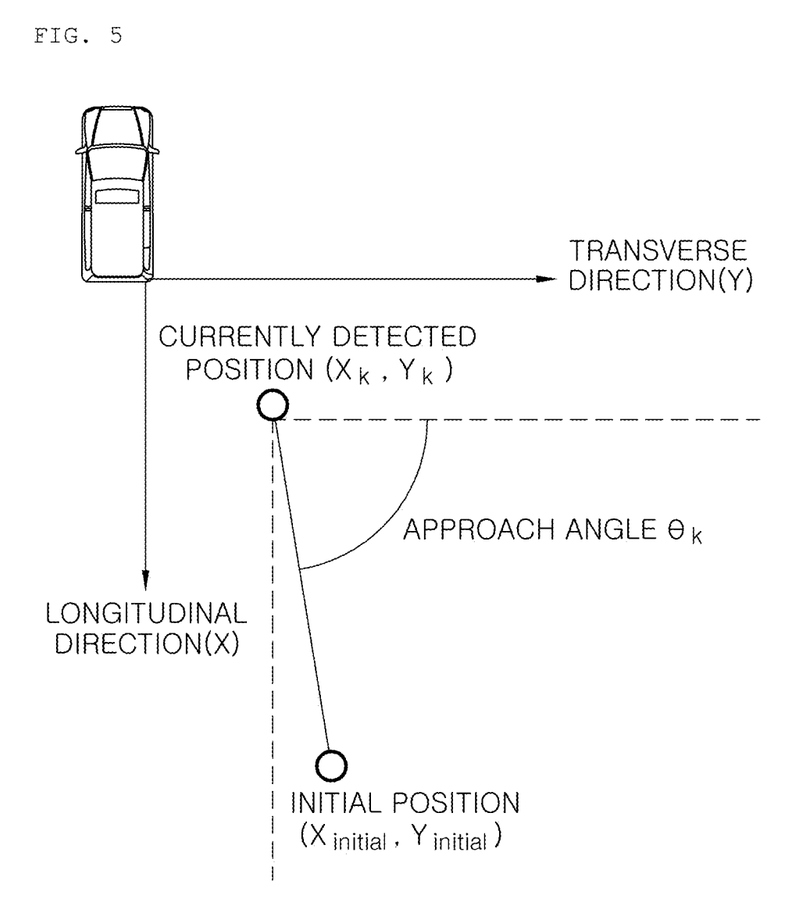
FIG. 5 is a diagram showing a method of estimating the moving direction of an obstacle according to an embodiment of the present invention.
Figure 6:
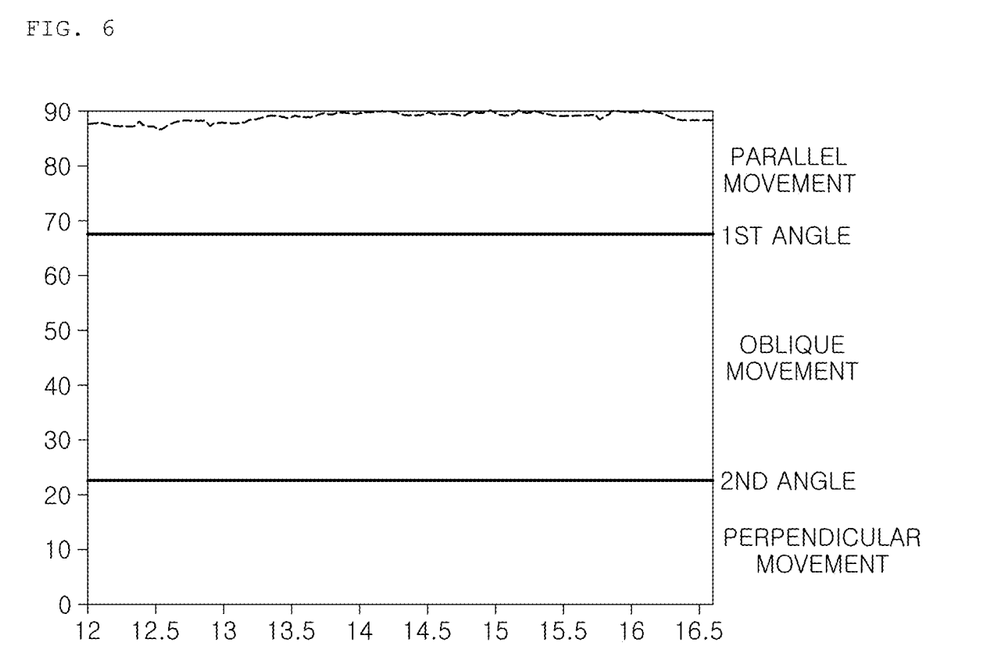
FIG. 6 is a graph showing the moving direction of an obstacle depending on the approach angle of the obstacle.

FIG. 5 is a diagram showing a method of estimating the moving direction of the obstacle B according to an embodiment of the present invention, and FIG. 6 is a graph showing the moving direction of the obstacle B depending on the approach angle of the obstacle B.

Referring to FIGS. 5 and 6, the direction estimation unit 40 may collect a plurality of positions of the obstacle B detected by the obstacle detection unit 20, and may calculate the ratio of the change in the longitudinal-directional position of the obstacle B to the change in the transverse-directional position of the obstacle B using the collected multiple positions of the obstacle B in order to estimate the moving direction of the obstacle B.

The obstacle detection unit 20 may detect a plurality of positions of the obstacle B in real time, and the direction estimation unit 40 may calculate the change in the position of the obstacle B using the multiple positions of the obstacle B. In one embodiment, the direction estimation unit 40 may estimate the moving direction of the obstacle B using the change between the current position of the obstacle B and the previously detected position of the obstacle B.

In particular, the direction estimation unit 40 may calculate the ratio of the change in the longitudinal-directional position of the obstacle B to the change in the transverse-directional position of the obstacle B, which occurs between the initially detected position of the obstacle B and the current position of the obstacle B, thereby estimating the moving direction of the obstacle B in real time.

Specifically, the approach angle of the obstacle B may be estimated using the equation below. Here, the approach angle of the obstacle B may be the angle between the transverse axis of the vehicle A and the moving direction of the obstacle B.

$$\theta_k = \tan^{-1}((X_k - X_{initial})/(Y_k - Y_{initial}))$$

Here, the amount of change from the initial position of the obstacle B to the current position of the obstacle B is used. Thus, even when the reflection point used for detection of the obstacle B changes, the approach angle changes little. As a result, it is possible to prevent incorrect detection of the possibility of a collision with the obstacle B.

As shown in FIG. 6, when the approach angle is equal to or greater than a first angle, it may be determined that the obstacle B is moving parallel to the vehicle A, and when the approach angle is less than a second angle, it may be determined that the obstacle B is moving perpendicular to the vehicle A. Furthermore, when the approach angle is less than the first angle and equal to or greater than the second angle, it may be determined that the obstacle B is moving obliquely relative to the vehicle A.

When the approach angle between the estimated moving direction of the obstacle B and the transverse axis of the vehicle A is equal to or greater than the first angle and equal to or less than 90 degrees, the collision determination unit 60 may determine that there is no possibility of a collision with the obstacle B.

Here, the first angle may be set in advance so as to be greater than the change in the approach angle, which is caused by movement of the main reflection point when the obstacle B moves parallel to the vehicle A, and to be less than an angle at which there is the possibility of a collision with the vehicle A due to the change in the angle of the obstacle B at a position close to the vehicle A.

When the approach angle between the moving direction of the obstacle B, estimated by the direction estimation unit 40, and the transverse axis of the vehicle A is equal to or greater than the predetermined first angle, the identity determination unit 30 may calculate the difference in the longitudinal-directional position between the plurality of obstacles B based on the detected positions of the plurality of obstacles B, and may determine that the plurality of obstacles B is the same object when the calculated difference in the longitudinal-directional position is equal to or less than a predetermined position difference.

That is, when the angle at which the obstacle B moves is equal to or greater than the first angle, the obstacle B may be determined to move parallel to the vehicle A. In this case, whether the first obstacle and the second obstacle are the same object may be determined in consideration only of the difference in the longitudinal-directional position between the first obstacle and the second obstacle.

When the approach angle between the moving direction of the obstacle B, estimated by the direction estimation unit 40, and the transverse axis of the vehicle A is less than the predetermined second angle, the identity determination unit 30 may calculate the difference in the transverse-directional position between the plurality of obstacles B based on the detected positions of the plurality of obstacles B, and may determine that the plurality of obstacles B is the same object when the calculated difference in the transverse-directional position is equal to or less than a predetermined position difference.

That is, when the angle at which the obstacle B moves is less than the second angle, the obstacle B may be determined to move perpendicular to the vehicle A. In this case, whether the first obstacle and the second obstacle are the same object may be determined in consideration only of the difference in the transverse-directional position between the first obstacle and the second obstacle.

When the approach angle between the moving direction of the obstacle B, estimated by the direction estimation unit 40, and the transverse axis of the vehicle A is less than the predetermined first angle and equal to or greater than the predetermined second angle, the obstacle B may be determined to move obliquely relative to the vehicle A. The identity determination unit 30 may determine whether the first obstacle and the second obstacle are the same object in consideration of both the difference in the transverse-directional position and the difference in the longitudinal-directional position.

Upon determining that the plurality of obstacles B is the same object, the identity determination unit 30 may determine the obstacle B detected first by the obstacle detection unit 20 to be a first obstacle, and may determine the obstacle B subsequently detected by the obstacle detection unit 20 to be a second obstacle. The collision determination unit 60 may determine the possibility of a collision with the second obstacle on the assumption that the moving direction of the second obstacle is the same as the moving direction of the first obstacle.

That is, when the identity determination unit 30 determines that the first obstacle and the second obstacle are the same object, the collision determination unit 60 may take the estimated moving direction of the first obstacle as the moving direction of the second obstacle, and may determine the possibility of a collision with the second obstacle based thereon.

Figure 7:
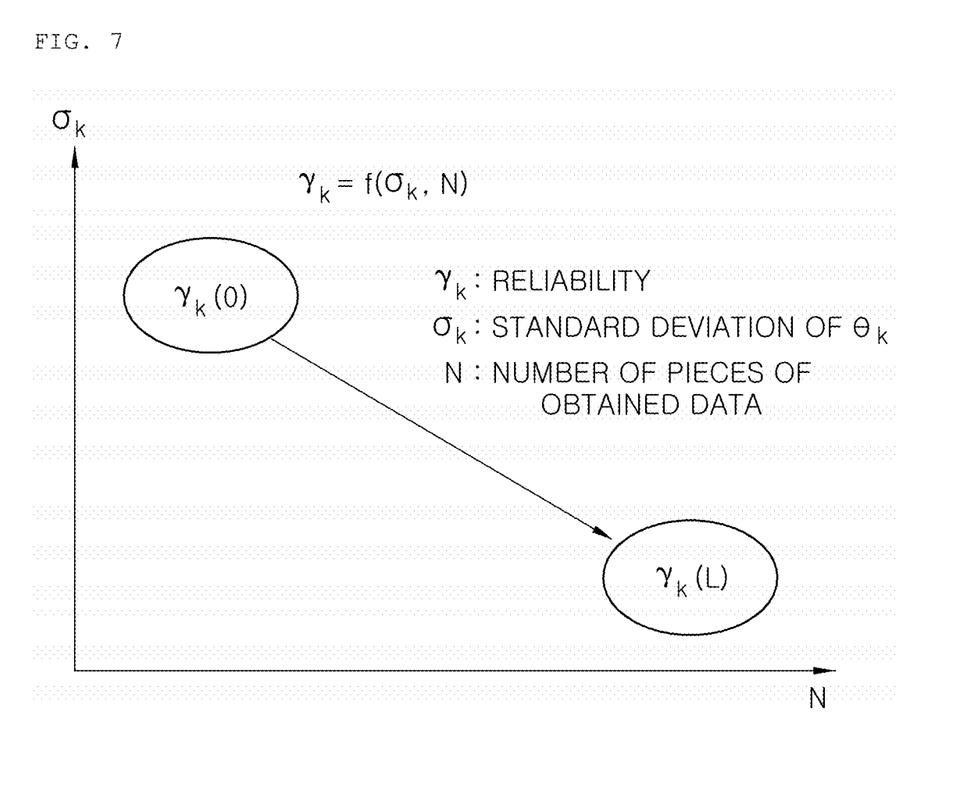
FIG. 7 is a graph showing determination of the reliability of an embodiment of the present invention.

FIG. 7 is a graph showing determination of the reliability of an embodiment of the present invention.

Referring to FIG. 7, the rear cross collision detection system according to the embodiment of the present invention may further include a reliability determination unit 50, which collects a plurality of moving directions of the obstacle B, estimated by the direction estimation unit 40, and determines the reliability of estimation of the moving direction of the obstacle B using the number of collected moving directions and the variance or standard deviation between the collected moving directions. When the estimation reliability determined by the reliability determination unit 50 is equal to or greater than a predetermined level, the collision determination unit 60 may determine the possibility of a collision with the obstacle B based on the moving direction of the obstacle B.

As shown in FIG. 7, the reliability of estimation of the moving direction of the obstacle B may be a function having, as variables, the number of collected moving directions and the variance or standard deviation between the collected moving directions.

The reliability of estimation of the moving direction of the obstacle B may be directly proportional to the number of collected moving directions, and may be inversely proportional to the variance or standard deviation between the collected moving directions.

The collision determination unit 60 may determine the possibility of a collision with the obstacle B based on the moving direction of the obstacle B when the estimation reliability determined by the reliability determination unit 50 is equal to or greater than a predetermined level.

Specifically, when the estimation reliability is equal to or greater than a predetermined level and the approach angle with respect to the moving direction of the obstacle B is within a predetermined angular range, it may be determined that there is no possibility of a collision with the obstacle B.

In particular, the number of detected positions and the number of collected moving directions of the second obstacle, which is detected later than the first obstacle, are small, and accordingly, the reliability of estimation of the moving direction of the second obstacle is low. Therefore, the moving direction of the second obstacle may be dependent on the moving direction of the first obstacle.

However, when the reliability of estimation of the second obstacle is equal to or greater than a predetermined level, the collision determination unit 60 may determine the possibility of a collision with the second obstacle based on the moving direction of the second obstacle, estimated based on the detected position of the second obstacle.

In one embodiment, when it is determined that the approach angle with respect to the moving direction of the obstacle B is within a predetermined angular range and thus there is no possibility of a collision with the obstacle B, the collision determination unit 60 may immediately determine that there is no possibility of a collision.

According to another embodiment, the collision determination unit 60 may set the transverse-directional speed of the obstacle B using the previously detected transverse-directional speed of the obstacle B and the currently detected transverse-directional speed of the obstacle B based on the moving direction of the obstacle B.

Specifically, the collision determination unit 60 may determine that there is the possibility of a collision with the obstacle B when the estimated time to collision, calculated based on the transverse-directional speed of the obstacle B, is equal to or less than a predetermined time.

Thus, when it is determined that the approach angle with respect to the moving direction of the obstacle B is within a predetermined angular range, the collision determination unit 60 may set the transverse-directional speed of the obstacle B using the previously detected transverse-directional speed of the obstacle B and the currently detected transverse-directional speed of the obstacle B. Specifically, the transverse-directional speed of the obstacle B used to calculate the estimated time to collision may be corrected using the equation below.

$$Y_{vel} = \alpha \cdot Y_{vel,k} + \beta \cdot Y_{vel,k-1}$$

Here, $Y_{vel,k}$ represents the currently detected transverse-directional speed, $Y_{vel,k-1}$ represents the previously detected transverse-directional speed, and $\alpha$ and $\beta$ are scaling factors.

Furthermore, $\alpha$ and $\beta$ may be set in advance so as to satisfy the following condition: $\alpha + \beta = 1$.

Figure 8:
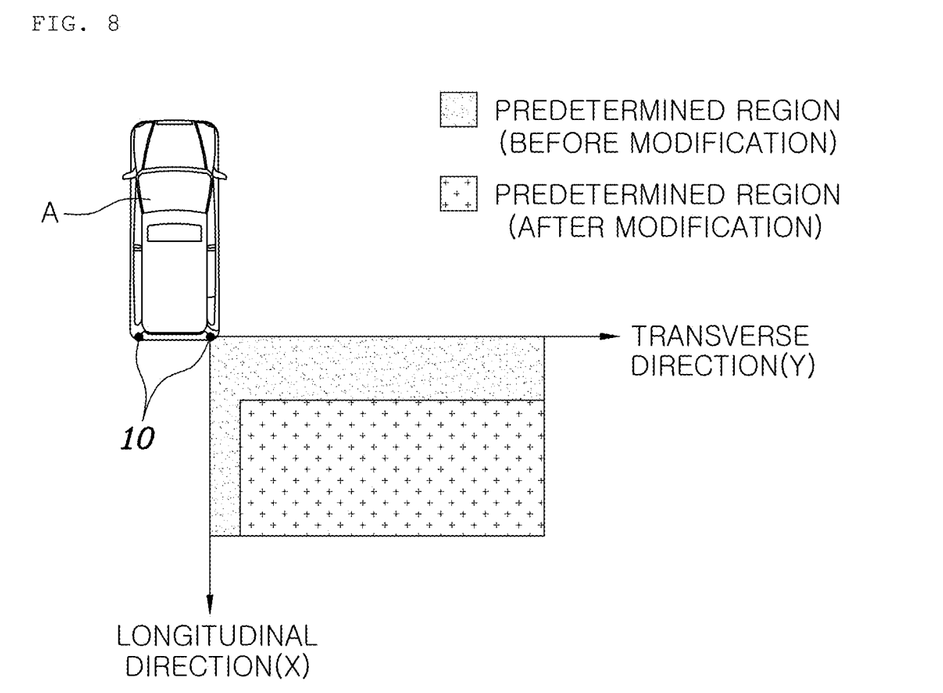
FIG. 8 is a diagram showing the change of a predetermined region according to an embodiment of the present invention.

FIG. 8 is a diagram showing the change of a predetermined region according to an embodiment of the present invention.

Referring to FIG. 8, the collision determination unit 60 may modify the predetermined region such that a portion of the region close to the vehicle A is excluded from the predetermined region based on the moving direction of the obstacle B.

Specifically, when it is determined that the approach angle with respect to the moving direction of the obstacle B is within a predetermined angular range, the predetermined region may be modified so as to be smaller than before. In particular, the predetermined region may be modified such that a region close to the rear portion of the vehicle A is excluded therefrom in the longitudinal direction. That is, the predetermined region may be modified so as to be spaced a predetermined distance apart from the vehicle A in the rearward direction. In addition, the predetermined region may also be formed so as to be spaced a predetermined distance apart from the vehicle A in the transverse direction.

Accordingly, in the case of the obstacle B, which moves close to the vehicle A from the region behind the vehicle A, whereby the main reflection point thereof is moved, it may be determined that there is no possibility of a collision with the obstacle B.

The rear cross collision detection system according to the embodiment of the present invention may further include a notification unit 70, which notifies a driver of the possibility of a collision with the obstacle B when the collision determination unit 60 determines that there is the possibility of a collision with the obstacle B. The notification unit 70 may provide visual, acoustic, or tactile notification using, for example, a cluster or an audio video navigation (AVN) system.

According to one embodiment, the notification unit 70 may determine whether the current gear of the vehicle A is the R-range (the backward moving range), and may provide notification to the driver only when the current gear of the vehicle A is the R-range.

According to another embodiment, the obstacle detection unit 20, the direction estimation unit 40, or the collision determination unit 60 may determine whether the current gear of the vehicle A is the R-range, and may detect the obstacle B, may estimate the moving direction of the obstacle B, or may determine the possibility of a collision with the obstacle B only when the current gear of the vehicle A is the R-range.

As is apparent from the above description, a rear cross collision detection system and method according to the present invention is capable of preventing false-positive determination of the possibility of a collision with an obstacle that moves parallel to a vehicle.

In addition, it is possible to improve the reliability of estimation of the moving direction of an obstacle by applying the previously detected moving direction of the obstacle to the obstacle detected in a region close to a vehicle.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A rear cross collision detection system of a vehicle comprising:
   an obstacle detection unit to receive an electromagnetic wave reflected from a reflection point of an obstacle in order to detect a position of the obstacle;
   an identity determination unit to, when a plurality of obstacles are detected by the obstacle detection unit, determine whether the plurality of obstacles is a same object based on positions or speeds of the plurality of obstacles; and
   a collision determination unit to determine a possibility of a collision with the plurality of obstacles detected by the obstacle detection unit based on a result of the determination by the identity determination unit,
   wherein the identity determination unit calculates a difference in a longitudinal-directional speed or a difference in a transverse-directional speed between the plurality of obstacles based on detected positions of the plurality of obstacles, and determines that the plurality of obstacles is the same object when the calculated difference in the longitudinal-directional speed or the calculated difference in the transverse-directional speed between the plurality of obstacles is equal to or less than a predetermined speed difference.

2. The rear cross collision detection system of claim 1, wherein the obstacle detection unit is connected to radar sensors, respectively located at rear-end portions of both lateral sides of the vehicle, in order to detect the position of the obstacle located behind or beside the vehicle.

3. The rear cross collision detection system of claim 1, wherein the identity determination unit further calculates a difference in a longitudinal-directional position or a difference in a transverse-directional position between the plurality of obstacles based on the detected positions of the plurality of obstacles, and determines that the plurality of obstacles is the same object when the calculated difference in the longitudinal-directional position or the calculated difference in the transverse-directional position between the plurality of obstacles is equal to or less than a predetermined position difference.

4. The rear cross collision detection system of claim 1, further comprising:
   a direction estimation unit to estimate a moving direction of the obstacle based on a position of the obstacle, detected by the obstacle detection unit, wherein the collision determination unit determines a possibility of a collision with the obstacle based on a moving direction of the obstacle, estimated by the direction estimation unit.

5. The rear cross collision detection system of claim 4, wherein the direction estimation unit calculates a ratio of a change in a longitudinal-directional position of the obstacle to a change in a transverse-directional position of the obstacle using positions of the plurality of obstacles, detected by the obstacle detection unit, in order to estimate a moving direction of the obstacle.

6. The rear cross collision detection system of claim 4, wherein, when an approach angle between a moving direction of the obstacle, estimated by the direction estimation unit, and a transverse axis of a vehicle is equal to or greater than a predetermined first angle, the identity determination unit calculates a difference in longitudinal directional position between the plurality of obstacles based on the detected positions of the plurality of obstacles, and determines that the plurality of obstacles is a same object when the calculated difference in the longitudinal-directional position is equal to or less than a predetermined position difference.

7. The rear cross collision detection system of claim 4, wherein, when an approach angle between a moving direction of the obstacle, estimated by the direction estimation unit, and a transverse axis of a vehicle is less than a predetermined second angle,
the identity determination unit calculates a difference in transverse directional position between the plurality of obstacles based on the detected positions of the plurality of obstacles, and determines that the plurality of obstacles is a same object when the calculated difference in the transverse-directional position is equal to or less than a predetermined position difference.

8. The rear cross collision detection system of claim 4, wherein, upon determining that the plurality of obstacles is a same object, the identity determination unit determines an obstacle detected first by the obstacle detection unit to be a first obstacle, and determines an obstacle subsequently detected by the obstacle detection unit to be a second obstacle, and
wherein the collision determination unit determines a possibility of a collision with the second obstacle based on an assumption that a moving direction of the second obstacle is identical to a moving direction of the first obstacle.

9. The rear cross collision detection system of claim 4, further comprising:
a reliability determination unit configured to collect a plurality of moving directions of the obstacle, estimated by the direction estimation unit, and to determine reliability of estimation of a moving direction of the obstacle using a number of collected moving directions and a variance or standard deviation between the collected moving directions,
wherein, when the reliability of estimation determined by the reliability determination unit is equal to or greater than a predetermined level, the collision determination unit determines a possibility of a collision with the obstacle based on the moving direction of the obstacle.

10. The rear cross collision detection system of claim 4, wherein the obstacle detection unit calculates a transverse-directional distance from a vehicle to the obstacle and a transverse-directional speed of the obstacle using the detected position of the obstacle, and
wherein the collision determination unit calculates an estimated time to collision based on the calculated transverse-directional distance and transverse-directional speed, and
determines that there is a possibility of a collision with the obstacle when the obstacle is located within a predetermined region and the estimated time to collision is equal to or less than a predetermined time.

11. The rear cross collision detection system of claim 10, wherein the collision determination unit sets the transverse-directional speed of the obstacle using a previously detected transverse-directional speed of the obstacle and a currently detected transverse-directional speed of the obstacle based on the moving direction of the obstacle.

12. The rear cross collision detection system of claim 10, wherein the collision determination unit modifies the predetermined region such that a portion of a region close to a vehicle is excluded from the predetermined region based on the moving direction of the obstacle.

13. The rear cross collision detection system of claim 1, further comprising:
a notification unit to notify a driver of a possibility of a collision with the obstacle when the collision determination unit determines that there is a possibility of a collision with the obstacle.

14. A rear cross collision detection method of a vehicle comprising:
receiving, by an obstacle detection unit of the vehicle, an electromagnetic wave reflected from a reflection point of an obstacle to detect a position of the obstacle;
when a plurality of obstacles are detected by the obstacle detection unit, determining, by an identity determination unit of the vehicle, whether the plurality of obstacles is a same object based on positions or speeds of the plurality of obstacles; and
determining, by a collision determination unit of the vehicle, a possibility of a collision with the plurality of obstacles detected by the obstacle detection unit based on a result of the determining whether the plurality of obstacles is a same object,
wherein the determining whether the plurality of obstacles is a same object comprises
calculating, by the identity determination unit, a difference in a longitudinal-directional speed or a difference in a transverse-directional speed between the plurality of obstacles based on detected positions of the plurality of obstacles, and determining that the plurality of obstacles is the same object when the calculated difference in the longitudinal-directional speed or the calculated difference in the transverse-directional speed is equal to or less than a predetermined speed difference.

* * * * *